United States Patent
Larvet

(10) Patent No.: US 8,453,105 B2
(45) Date of Patent: May 28, 2013

(54) DEVICE AND METHOD FOR AUTOMATICALLY BUILDING APPLICATIONS FROM SPECIFICATIONS AND FROM OFF-THE-SHELF COMPONENTS SELECTED BY SEMANTIC ANALYSIS

(75) Inventor: Philippe Larvet, Forges les Bains (FR)

(73) Assignee: Alcatel Lucent, Paris (FR)

( * ) Notice: Subject to any disclaimer, the term of this patent is extended or adjusted under 35 U.S.C. 154(b) by 949 days.

(21) Appl. No.: 12/329,107

(22) Filed: Dec. 5, 2008

(65) Prior Publication Data

US 2009/0150853 A1 Jun. 11, 2009

(30) Foreign Application Priority Data

Dec. 7, 2007 (EP) .................................. 07301646

(51) Int. Cl.
*G06G 9/44* (2006.01)
(52) U.S. Cl.
USPC .......................................... 717/101; 717/100
(58) Field of Classification Search
USPC ........................................................ 717/101
See application file for complete search history.

(56) References Cited

U.S. PATENT DOCUMENTS

| | | | | |
|---|---|---|---|---|
| 5,699,507 | A * | 12/1997 | Goodnow et al. | 714/38.1 |
| 7,149,734 | B2 * | 12/2006 | Carlson et al. | 1/1 |
| 7,197,739 | B2 * | 3/2007 | Preston et al. | 717/106 |
| 7,484,225 | B2 * | 1/2009 | Hugly et al. | 719/330 |
| 7,761,858 | B2 * | 7/2010 | Chang et al. | 717/140 |
| 7,778,817 | B1 * | 8/2010 | Liu et al. | 704/9 |
| 8,032,644 | B2 * | 10/2011 | Larvet | 709/229 |
| 8,050,907 | B2 * | 11/2011 | Baisley et al. | 704/9 |
| 2002/0107844 | A1 * | 8/2002 | Cha et al. | 707/3 |
| 2002/0152206 | A1 * | 10/2002 | Gusler et al. | 707/5 |
| 2003/0046061 | A1 * | 3/2003 | Preston et al. | 704/9 |
| 2004/0172612 | A1 * | 9/2004 | Kasravi et al. | 717/101 |
| 2004/0268309 | A1 * | 12/2004 | Grover et al. | 717/120 |
| 2005/0021383 | A1 * | 1/2005 | Fliess et al. | 705/8 |
| 2006/0048093 | A1 * | 3/2006 | Jain et al. | 717/104 |
| 2008/0189278 | A1 * | 8/2008 | Akkiraju et al. | 707/6 |

OTHER PUBLICATIONS

Girardi M.R. et al., "A Software Reuse System Based on Natural Language Specifications," Computing and Information, Proceedings ICCI, Fifth International Conference on Sudbury, Ont., Canada, May 27-29, 1993, Los Alamitos, CA, USA, IEEE Comput. Soc., pp. 507-511, May 27, 1993.

Zhang N. et al., "A Component-based Framework and Reusability in Garment," XP002478869, Database accession No. 7176521, The Institution of Electrical Engineers, Stevenage, GB, 2001.

(Continued)

*Primary Examiner* — Don Wong
*Assistant Examiner* — Theodore Hebert
(74) *Attorney, Agent, or Firm* — Fay Sharpe LLP

(57) ABSTRACT

When building applications from specifications and software components, a software component is associated to a semantic description comprising at least one pertinent term for defining each public operation this software component is able to perform. An analysis module receives a specification describing an application to be built, performs a semantic analysis of this specification to extract elementary requirements from the specification text and links between these elementary requirements, these links defining the structure of the specification. The analysis module extracts, for each elementary requirement, the pertinent terms it comprises and builds a semantic description based on its extracted pertinent terms and representing the semantics of this elementary requirement. The analysis module accesses the storing module to determine, for each extracted elementary requirement, which component(s) can perform the extracted elementary requirement, and a processing module assembles the determined software components according to the structure of the specification.

14 Claims, 1 Drawing Sheet

OTHER PUBLICATIONS

Proceedings Eighth Asia-Pacific Software Engineering Conference Dec. 4-7, 2001, Macao, China, 2001, pp. 411-418, Proceedings Eighth Asia-Pacific Software Engineering Conference IEEE Comput. Soc. Los Alamitos, CA, USA.

Hatcliff J., et al. "Cadena: An Integrated Development, Analysis, and Verification Environment for Component-based Systems," Proceedings of the 25$^{th}$ International Conference on Software Engineering; Los Alamitos, CA: IEEE Comp. Soc, US, vol. Conf. 25, 13 pages, May 2003.

Girardi M. R. et al., "An Approach to Improve the Effectiveness of Software Retrieval," Proc. of the 3$^{rd}$ Irvine Software Symposium (ISS'93), Irvine, CA, USA, pp. 89-100, Apr. 30, 1993.

European Search Report.

* cited by examiner

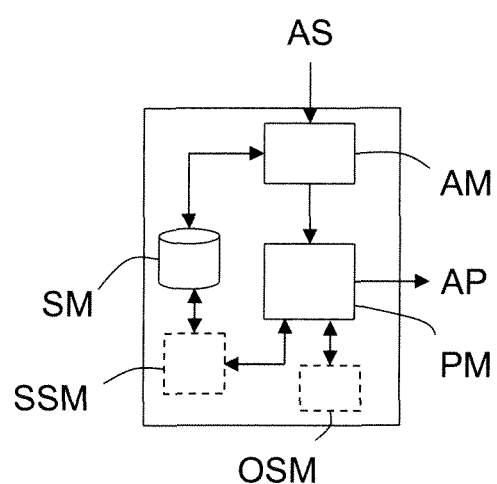

DEVICE AND METHOD FOR AUTOMATICALLY BUILDING APPLICATIONS FROM SPECIFICATIONS AND FROM OFF-THE-SHELF COMPONENTS SELECTED BY SEMANTIC ANALYSIS

The present invention relates to the design of applications, and more precisely to a method and a device for building applications from off-the-shelf software components.

According to the accepted definitions used as references in the scope of object-oriented and component-based application development, the term "design" means here the stage of an application that describes how this application will be implemented, at a logical level above the code. For design, strategic and tactical decisions are made to meet the required functional and quality requirements of the application. According to the description made for instance by Grady Booch in his book "Object-Oriented Analysis and Design with Applications", 3rd Edition—Cased, Addison-Wesley (2007), ISBN 9780201895513, the results of this stage are represented by design-level models: static view, state machine view, and interaction view. The activity of design leads to the architecture of the application, which is the organizational structure of this application, including: its decomposition into software components, the connectivity between these software components, interaction mechanisms, and the guiding principles that inform the design of the application.

Many authors have described several methods to guide the building of (software) component-based applications but these methods have two main drawbacks: they are fully manual, and the process of finding and assembling the right components is not directly derived from the specification of the application to be built, this specification describing the functional and non functional requirements the application has to cover.

The object of this invention is to propose a new method and the corresponding device intended for automatically building applications from off-the-shelf software components, by means of a semantic analysis of the application specifications and by considering that the application design (i.e. the architecture of the solution) can be derived from the relationships between the requirements expressed in the text of the application specification (i.e. the architecture of the problem).

For this purpose, it provides a method for building applications from specifications and ("off-the-shelf") software components, consisting, each time one receives a specification describing an application to be built:

of performing a semantic analysis of this specification, in order to extract elementary requirements from the text of the specification, and links between these elementary requirements, the set of these links being called hereafter "the overall structure of the specification", then of extracting, for each elementary requirement, the pertinent terms it comprises and building, for each elementary requirement, a "semantic description" based on its extracted pertinent terms and which represents "the semantics of this elementary requirement", then of accessing to at least one component repository, where each component is registered and described as a "semantic software component" (this means that each component is associated to a "semantic description" comprising at least one pertinent term to define each public operation this software component is able to perform), to determine (select), for each extracted elementary requirement, by comparing the semantics of this elementary requirement and the components semantic descriptions, which component(s) is (are) able to cover the said extracted elementary requirement, and, of finally assembling these determined software components according to the overall structure of the specification, in order to build the application.

So, semantic descriptions can be associated to elementary requirements as well as software components:

semantic descriptions of elementary requirements are determined and associated to the text of the elementary requirement itself, i.e. the sentence(s) composing the expression of the elementary requirement;

semantic descriptions of software components are determined and associated to the public operations) this component is able to perform, as it is detailed below.

The method according to the invention may include additional characteristics considered separately or combined, and notably:

at least some of the semantic descriptions of the software components may comprise i) the goal of the operation the software component is able to perform, ii) at least one domain identifier designating a domain where are defined the terms describing the operation goal and the input(s)/output parameters of this operation, and iii) pertinent terms and/or specific meta-data associated to these input(s)/output parameters;

for each extracted elementary requirement, one may determine a semantic distance between its semantic description and the semantic description of each of the stored software components, then one may select the stored software component corresponding to the minimal semantic distance, this selected software component being therefore intended to implement the elementary requirement;

one may associate a primary n-uplet of words, for instance synonyms, this n-uplet being called a "syn-uplet" hereafter, to each pertinent term of an elementary requirement, this syn-uplet being then called a "req-uplet" hereafter; by the same way, one may also associate a syn-uplet to each pertinent term of the goal of each public operation of each software component, this syn-uplet being then called a "comp-uplet" hereafter, and one may compare each of these req-uplets to each of these comp-uplets in order to determine the semantic distance between each elementary requirement and each stored software component;

one may determine a semantic proximity representing the number of words that are common to each req-uplet and to each comp-uplet, and, for each elementary requirement, one may build a secondary n-uplet, for instance being called "sem-uplet" and expressing the semantic proximities between each of the req-uplets and the ones of each of the comp-uplets, each secondary n-uplet defining a semantic distance, then one may select the stored software component corresponding to the secondary n-uplet which defines the minimal semantic distance;

one may establish the same pertinent links as those defining the overall structure of the specification between the selected stored software components that correspond to the extracted elementary requirements, in order to optimize the structure of the application;

to determine this overall structure of the specification, one may determine a semantic proximity representing the number of words that are common to the req-uplets of each pair of elementary requirements, and, for each elementary requirement, one may build a secondary n-uplet, said "sem-uplet", comprising the semantic proximities between its req-uplet and the ones of the other elementary requirements, each sem-uplet defining a semantic distance, then one may establish a pertinent link between two distinct elementary requirements when the value of their sem-uplet is maximal.

The invention also provides a device for building applications from specifications and software components and comprising:

- a storing means for storing semantic software components, each of them being made of a software component associated to a semantic description comprising at least one pertinent term for defining each public operation this software component is able to perform,
- an analysis means arranged, each time that is received a specification describing an application to be built, i) for performing a semantic analysis of this specification in order to extract elementary requirements from the text of the specification, and links between these elementary requirements, the set of these links being called hereafter "the overall structure of the specification", then ii) for extracting, for each elementary requirement, the pertinent terms it comprises, and for building, for each elementary requirement, a "semantic description" based on its extracted pertinent terms and which represents "the semantics of this elementary requirement", then iii) for accessing to the storing means to determine (select), for each extracted elementary requirement, by comparing the semantics of this elementary requirement and the components semantic descriptions, which component(s) is (are) able to cover this extracted elementary requirement, and,
- a processing means for assembling the determined software components according to the overall structure of the specification in order to build the application.

The device according to the invention may include additional characteristics considered separately or combined, and notably:

- the analysis means may be arranged for determining, for each extracted elementary requirement, a semantic distance between its semantic description and the semantic description of each of the stored software components, then for selecting the stored software component corresponding to the minimal semantic distance, this selected software component being therefore intended to implement the elementary requirement;
- the analysis means may be arranged for associating a primary n-uplet of words, for instance synonyms, this n-uplet being called a "syn-uplet" hereafter, to each pertinent term of an elementary requirement, this syn-uplet being then called a "req-uplet" hereafter, and for comparing each of these req-uplets to each comp-uplets (syn-uplet associated to each pertinent term of the goal of each public operation of each software component) in order to determine the semantic distance between each elementary requirement and each stored software component;
  - the analysis means may be arranged i) for determining a semantic proximity representative of the number of words that are common to each req-uplet and to each comp-uplet, ii) for building, for each elementary requirement, a secondary n-uplet, for instance being called "sem-uplet" and expressing the semantic proximities between each of the req-uplets and the ones of each of the comp-uplets, each secondary n-uplet defining a semantic distance, and iii) for selecting the stored software component corresponding to the secondary n-uplet which defines the minimal semantic distance;
- the processing means may be arranged for establishing the same pertinent links as those defining the overall structure of the specification between the selected stored software components that correspond to the extracted elementary requirements, in order to optimize the structure of the application,
- to determine the overall structure, the analysis means may be arranged i) for determining a semantic proximity representative of the number of words that are common to the req-uplets of each pair of elementary requirements, and ii) for each requirement, for building a secondary n-uplet (or "sem-uplet"), comprising the semantic proximities between its req-uplet and the ones of the other elementary requirements, each sem-uplet defining a semantic distance, then for establishing a pertinent link between two distinct elementary requirements when the value of their sem-uplet is maximal.

Other features and advantages of the invention will become apparent on examining the detailed specifications hereafter and the appended drawing, wherein the unique FIGURE schematically illustrates an example of embodiment of a device according to the invention.

The appended drawing may serve not only to complete the invention, but also to contribute to its definition, if need be.

The invention aims at offering a device, and the associated method, intended for automatically building applications from the text of their specifications, by using off-the-shelf software components.

The invention addresses any type of application described by a specification and which can be built from an assembly of off-the-shelf software components.

The term "application" means here a set of inter-related (software) components, each of them having a functionality, expressed as a set of at least one public function, called operation, and encapsulating and managing its own data. This definition is the component paradigm, derived from object-orientation, and is today's standard of development.

Moreover, the expression "off-the-shelf software component" means here a piece of executable code intended for implementing a precise elementary function (i.e. an atom of functionality), such as a file management mechanism, a database access, a GUI display mechanism, a text translation, a conversion module, a HTML page reading from URL, an elementary function for text processing, etc.

As schematically illustrated in the unique FIGURE, a device D according to the invention comprises at least a storing means (i.e., a non-transitory computer-readable medium). SM, an analysis module AM and a processing module PM.

The storing means SM is intended for storing, at least, semantic software components SSC. Each semantic software component SSC is made of a software component SC which is associated to a semantic description SD.

The expression "semantic description of a software component" means here a description comprising at least one pertinent term which defines the goal of a public operation (or function) that the associated software component SC is able to perform. This goal is preferably expressed simply in natural language form (i.e. with pertinent terms) and describes clearly what the component SC really does, what its function(s) is (are) and which data it manipulates (i.e. the input(s)/output(s) of its operation(s)). Preferably, each component's semantic description (being called "semantic card", for instance) SD also contains at least one domain identifier which designates a domain where are defined the terms describing each operation.

For instance, each semantic description SD of a software component is an XML representation where inputs and output data are described with three main attributes:
- a data name (or identifier);
- a concept (or pertinent term) associated with the data, expressed in reference to a concept defined as a class in an external ontology or in an external dictionary or thesaurus, in order to specify the semantics of the data. Here, the ontology refers, for instance, to the domain addressed by the component SC and whose name is mentioned in the semantic card's header; and
- a semantic tag of the data (called "semTag", for instance), which represents a stereotype of a semantic data type and specifies the nature of the data. This semTag will be useful to determine and optimize the components' interactions, as it will be explain below.

Any type of storing means SM, capable of storing the semantic software components SSC and known from the man skilled in the art, may be used, and notably databases, flash memories, ROMs or RAMs, flat files systems and any other kind of repository.

The analysis module AM is arranged for intervening each time its device D receives a specification AS which describes an application AP to be built.

The expression "application specification" means here at least one sentence which defines at least one requirement that the desired application should fulfill. More precisely, the application requirements describe what the application AP will do, and what its functional and non-functional features are. These requirements are preferably expressed in natural language, but they may be expressed under the form of any formal or non-formal textual representation.

The analysis module AM is intended, each time an application specification AS is received:
  for performing a semantic analysis of this received application specification AS in order:
    to extract elementary requirements SR from the text of the specification AS, for instance by means of a grammatical analyzer, and links between these elementary requirements SR, the set of these links being called hereafter "the overall structure (or logical assembly) of the specification", then
    to extract, for each elementary requirement SR, the pertinent terms it comprises, and to build, for each elementary requirement SR, a "semantic description" based on its extracted pertinent terms and which represents "the semantics of this elementary requirement", then
  for accessing to the storing means SM to determine (select), for each extracted elementary requirement SR, by comparing the semantics of this elementary requirement SR and the components semantic descriptions SD, which component(s) is (are) able to cover this extracted elementary requirement SR.

It is important to note that the analysis module AM may be divided in two sub-modules, a first one for performing the semantic analysis and a second one for determining into the storing means (or component repository) SM the component(s) that is (are) able to cover the elementary requirement SR extracted by the first sub-module.

In other words, the analysis module AM determines the meaning of each sentence representing the elementary requirements SR (i.e. its semantics), and expresses it in terms of an appropriate computable data structure. The idea is to mark every semantic atom of functionality with their appropriate semantic data structure, in order to compare later this structure to the equivalent semantic data structure of the stored software components SC, to determine which component is able to cover which (elementary) requirement SR. Indeed, each sentence (or atom of requirement) can be evaluated and marked, in order to receive its own semantic data. It is important to note that this process is different from an ontology-based requirement analysis approach, in which the software requirement analysis method is based on domain ontology technique, where can be established a mapping between a software requirement specification and several domain ontologies. Let us remind that an ontology is a formal description of the concepts that are manipulated in a given domain and of the relationships between these concepts. In the present invention, no external ontology is used to help the requirement analysis, because the semantics is extracted from the text itself.

The semantics of the operations' goals is preferably defined with precise rules, such as the following ones:
  goals are expressed in natural language, using specific words;
  these specific words belong to "lists of concepts" that are embedded in the semantic card SD and summarize the pertinent words to be used to write goals; and
  these "lists of concepts" may be for example described in external ontologies, i.e. in formal descriptions of the related domains, which are referenced in the semantic card SD, or may be simple references to definitions of an external dictionary or thesaurus.

Such rules help to write operation goals that are terse and unambiguous.

A non limitative example of a semantic card SD associated to a RSS-feed-accessor component is given hereafter:

```
<semCard>
<URL>http://xxx.xx.xxx.x/components/RSS/RSS_Component.asmx</URL>
<component name="RSS">
<domains>
<domain name="RSS">
<concepts list="RSS, RSS_feed, URL, news"/>
</domain>
<domain name="News">
<concepts list="news, title, titles, description, article, text, News Agency"/>
</domain>
</domains>
<operation name="getAllTitles">
<goal>Deliver the titles of all the news of the RSS feed addressed by a given URL.</goal>
<inputs>
<input name="URL_RSS" concept="RSS#URL"semTag="URL"/>
</inputs>
<output name="titles" concept="News#title" semTag="text"/>
</operation>
<operation name="getDescriptionOfTitle">
<goal>Deliver the description of the title of one news of the RSS feed addressed by a given URL.</goal>
<inputs>
<input name="URL_RSS" concept="RSS#URL" semTag="URL"/>
<input name="title" concept="News#title" semTag="short_text"/>
</inputs>
```

```
    <output               name="description_of_title"
        concept="News#description" semTag="text"/>
    </operation>
</component>
</semCard>.
```

The logical assembly (or overall structure) of the pertinent terms of the requirements SR consists in pertinent links between pertinent terms and the logical order therebetween. For instance, in the sentence "The application has to access the Internet, to generate a script from the file "Parameters.txt" and to execute this script", the pertinent terms (or concepts) representing the requirements are "access Internet", "generate script", "file "Parameters.txt"" and "execute script", and the logical order of these pertinent terms is "access Internet", "read file "Parameters.txt"", "generate script" and "execute script".

It is important to notice that the analysis module AM is arranged for determining the logical assembly between elementary requirements SR of a specification. Indeed, it is assumed that in the set of elementary requirements SR composing the specification AS, the requirements SR are logically linked to each other. This results from the fact that a link between two different requirements leads to a link between the components implementing these requirements (two pieces of requirement are linked to each other when they both talk about given data, constraint, functionality or feature of the targeted application AP). Here, it is assumed that if some pertinent links exist between requirements SR, the same pertinent links exist between the components SC implementing these requirements SR. So, a "requirement network" is determined by analyzing the links between the requirements (or requirement atoms) SR in order to determine the overall structure of the application specification AS that describes the problem. In other words, the problem structure is isomorphic to the solution structure.

For example, let us consider an application intended for calculating the VAT of an invoice, and let us suppose the text of the application specification AS contains two different paragraphs concerning the VAT computation: a first one explaining the general method to compute the VAT, and a second one (perhaps located several pages later into the specification AS) giving the different VAT rates according to the product categories. These two paragraphs are two pieces of requirements SR that are linked together because they address the same data. Consequently, the two components SC implementing these requirements SR will have to be linked together, because the computation of the VAT for a given product needs the general method to calculate a VAT amount.

Each time the analysis module AM has determined the "semantics of the requirements SR" of a received application specification AS and the logical assembly of these requirements SR, it accesses to the storing means SM to select the semantic software components SSC whose semantic descriptions SD correspond to the semantics of the requirements.

For this purpose, the analysis module AM has to compare the meaning of a requirement extracted from the application specification AS with each component's goal, which is part of the component's semantic card SD. This is done in order to be able to choose this component SC because it is intended to cover the requirement.

As mentioned before, this comparison requires the determination of the meaning of the specification text. Here, it is considered that the meaning is made up of the concatenation of elementary meanings of all the pertinent terms that compose each sentence of the specification text. So, comparing the meaning of two different texts implies comparing different terms or concepts (two by two), in order to determine whether they are semantically close or not.

Consequently, it is necessary to have at one's disposal a way to express the meaning of an elementary term, in order to be able to process this comparison. To do so, it is possible to build a primary n-uplet, with the synonyms of the term that can be found in a thesaurus. Such a primary n-uplet is called "syn-uplet" hereafter.

For example, the syn-uplets of the terms "battle", "war" and "peace" can be respectively:

battle={fight, clash, combat, encounter, skirmish, scuffle, mêlée, conflict, confrontation, fracas, fray, action; struggle, crusade, war, campaign, drive, wrangle, engagement}, war={conflict, combat, warfare, fighting, confrontation, hostilities, battle; campaign, struggle, crusade; competition, rivalry, feud}, and peace={concord, peacetime, amity, harmony, armistice, reconciliation, ceasefire, accord, goodwill; agreement, pact, pacification, neutrality, negotiation}.

Notice that if a syn-uplet is built for a term of a requirement SR, it can be called a "req-uplet", and if a syn-uplet is built for a term of a public operation's goal of a software component SC, it can be called a "comp-uplet".

On syn-uplets, i.e. on req-uplets and comp-uplets, on can define the following functions:

syn(word) is the syn-uplet for the term "word",

N1 designates the syn-uplet for "word1" and N2 designates the syn-uplet for "word2": N1=syn(word1) and N2=syn(word2), card(N1) is the cardinal of the syn-uplet N1, i.e. the number of synonyms inside N1, common(N1, N2) is the number of synonyms that are common to N1 and N2, and avg(N1, N2) is the average of the cardinals of N1 and N2, then, with the above mentioned examples of syn-uplets, card(common(syn("battle"), syn("war")))=9. In other words, there are nine synonyms common to "battle" and "war".

It is also possible to define a semantic proximity between two terms T1 and T2 by calculating a ratio taking into account the common synonyms within the two syn-uplets syn(T1) and syn(T2), for instance.

Such a semantic proximity (being called "semProx", for instance) can be given by the following formula, for instance:

semProx($T1$, $T2$)=100*card(common(syn$T1$), syn$T2$)))/avg(syn$T1$), syn$T2$)).

With the above mentioned examples of syn-uplets, the semantic proximity of the syn-uplets of "battle" and "war" is given by semProx("battle", "war")=100*9/0.5*(19+13)= 900/16=56.25. In other words, in the union of the sets of synonyms for "battle" and "war", 56.25% of the elements are found in duplicate. As another sample, the semantic proximity of the syn-uplets of "war" and "peace" is given by semProx("war", "peace")=0, which is logical.

The semantic proximity expresses the proximity ratio between two terms. For instance, if the semantic proximity is greater than a first chosen threshold A (for instance 50) or close to 100, one considers that the two terms are semantically close. Inversely, if the semantic proximity is less than a second chosen threshold B (for instance 10) or close to zero, one considers that the two terms are semantically distant. Values of thresholds A and B can be "tuned" according to the category of texts to be processed.

For instance, the determination of the meaning of a given sentence can be made as follows.

In a first step the sentence is analyzed and the pertinent terms (words) are extracted. Non-pertinent words like articles, prepositions, conjunctions, etc, are ignored.

In a second step, for each pertinent term (word), a corresponding syn-uplet is built.

Finally, in a third step a global n-uplet for the whole sentence is built by assembling all the syn-uplets of the pertinent words contained in the sentence. Such a global n-uplet can be called "phrase-uplet" (it can be considered as a super-n-uplet, i.e. a n-uplet of n-uplets).

As an example, if a requirement SR, extracted from the specification AS of a call management system is "The caller makes a call to a receiver by creating a message that contains the call subject, submitted to the receiver at the same time", then the pertinent terms are: caller, call, make a call, receiver, message, subject and submit. The phrase-uplet for this requirement SR can be the concatenation of the following syn-uplets:

caller={phone caller, telephone caller, visitor, guest, company},
call={phone call, telephone call, buzz, bell, ring; demand, request, plea, appeal, bid, invitation},
make a call={phone, make a demand, send a request},
receiver={recipient, heir, addressee, beneficiary, inheritor, heritor},
message={communication, memo, memorandum, note, letter, missive, dispatch},
subject={topic, theme, focus, subject matter, area under discussion, question, issue, matter, business, substance, text; field, study, discipline area},
submit={offer, present, propose, suggest, tender}.

The comparison of one sentence S1 of a specification AS with two other sentences S2 and S3 of semantic descriptions (or cards) SD associated to software components SC can be made by comparing their phrase-uplets. This comparison provides a result that could be used to calculate a semantic distance between sentences, as will be explained below. The phrase-uplet comparison steps can be as follows:

the internal syn-uplets of two phrase-uplets are compared two by two. In other words every syn-uplet of the phrase-uplet of S1 is compared to every syn-uplet of the phrase-uplets of S2 and S3,
a semantic proximity (semProx) is calculated for each pair of syn-uplets,
ordered secondary n-uplets, for instance called "sem-uplets", are built. Each semantic n-uplet (or sem-uplet) comprises the semantic proximities between each syn-uplet of S1 and the ones of S2 or S3, and defines a semantic distance,
the semantic n-uplet offering the minimal semantic distance is hold back, and the sentence S2 or S3 which is concerned by this semantic n-uplet is considered to be semantically closer to S1 and therefore its corresponding stored software component SC is selected.

The table given hereafter is a non limiting example of searching for correspondences between the requirements SR "The caller makes a call to a receiver by creating a message that contains the call subject, submitted to the receiver at the same time" and a sample of a component set stored in a component repository SM. The pertinent terms of the requirement are: {caller, call, make call, receiver, message, subject, submit}. The sem-uplets shown in the last right column of the following table are the results of the comparison between the syn-uplet of these pertinent terms and those calculated from the component's goal. A rapid view of these sem-uplets helps to easily determine the components SC capable of fulfilling the requirement.

| Component Name | Component Goal | sem-uplet |
| --- | --- | --- |
| AL Stock | returns the value of Alcatel-Lucent's stock, in Euros and Dollars | {0, 0, 0, 0, 0, 0, 0} |
| AnDiscOrGeX | analyzes, discovers, orchestrates, generates and executes a composed service responding to a given user's request | {24, 15, 0, 0, 0, 0, 0, 0, 0} |
| Calculator | returns the result of a two-terms operation among the four basic ones | {12, 0, 0, 0, 0, 0, 0} |
| ContactInfoSearcher | returns useful information concerning a person registered in a given X500 directory | {21, 15, 0, 0, 0, 0, 0, 0} |
| DateTime | returns the current date and time | {0, 0, 0, 0, 0, 0, 0} |
| Definition | returns the english dictionary definition of a given word | {13, 0, 0, 0, 0, 0, 0} |
| FaxSender | sends the given text of a fax to a given fax number | {35, 28, 0, 0, 0, 0, 0} |
| LanguageFinder | determines the language in which a given text is written | {12, 0, 0, 0, 0, 0, 0} |
| MakeCall | makes a call between two given phone numbers | {100, 100, 0, 0, 0, 0, 0} |
| Meteo | returns weather information for a given city in France | {12, 0, 0, 0, 0, 0, 0} |
| MessageSender | sends the text of a message to a given recipient | {100, 80, 80, 0, 0, 0, 0} |
| PhraseVectorBuilder | returns the phrase-uplet built from two different given sentences | {10, 0, 0, 0, 0, 0, 0} |
| RSS_Titles | returns all the RSS titles for a given URL of an RSS feed | {0, 0, 0, 0, 0, 0, 0} |
| RSS_Description | returns the description of a given RSS title for a given URL of an RSS feed | {0, 0, 0, 0, 0, 0, 0} |
| SemanticDiscovery | returns a list of the discovered services matching with a given list of concepts | {0, 0, 0, 0, 0, 0, 0} |
| SemanticQueryAnalyzer | returns the list of the pertinent concepts extracted from of a given phrase written in natural language | {10, 0, 0, 0, 0, 0, 0} |
| SMSSender | sends a message as an SMS to a given mobile phone number | {100, 80, 0, 0, 0, 0, 0} |
| Synonyms | returns the list of synonyms of a given word | {0, 0, 0, 0, 0, 0, 0} |
| SynVectorBuilder | returns the syn-uplet of a given sentence | {10, 0, 0, 0, 0, 0, 0} |
| TermExtractor | returns the pertinent terms extracted from a given text | {12, 0, 0, 0, 0, 0, 0} |
| Translator | returns the version of a given text translated into a given target language | {10, 0, 0, 0, 0, 0, 0} |

The processing module PM is arranged for assembling the software components SC of the determined semantic software components SSC according to the logical assembly of the specification (i.e. the overall specification structure that has been determined by the analysis module AM) in order to build the desired application AP.

As mentioned before, this assembling is based on the assumption that the pertinent links between the requirements of the application specification AS (or problem) have a similar correspondence with the links between the determined software components SSC (blocks of the solution).

So, the processing module PM organizes the selected components SC whose semantic distances are the shortest with the semantic atoms of requirements in order to constitute an initial architecture of the application AS. This initial architecture is made by replicating the problem structure (or requirement network) and using solution atoms (or components SC) instead of problem atoms (or requirements).

As mentioned before, the requirement network, which summarizes and represents the pertinent links between the specification requirements, is determined by the analysis module AM. For this purpose, the analysis module AM can use the above mentioned sem-uplet (secondary n-uplet) approach to reveal the pertinent links between the requirements (or requirement atoms). The sentences of the specification AS are semantically compared two by two, by using the phrase-uplet plus sem-uplet approach. More precisely, in the case of a comparison between a requirement R1 of a specification AS and two other requirements R2 and R3 of the same specification AS:

the internal syn-uplets of two phrase-uplets are compared two by two. In other words every syn-uplet of the phrase-uplet of R1 is compared to every syn-uplet of the phrase-uplets of R2 and R3, a semantic proximity (semProx) is calculated for each pair, ordered secondary n-uplets (semantic n-uplets, called sem-uplets) are built. Each sem-uplet comprises the semantic proximities between each syn-uplet of R1 and the ones of R2 or R3, and defines a semantic distance. So, one gets a set of n-uplets that represent the links, in terms of semantic distance, of each requirement with respect to the others. It is possible to "tune" the level of the semantic distances to keep only the "best" sem-uplets in terms of semantic proximity, i.e. the most semantically pertinent links for a given requirement. It means that it is assumed that each requirement has a limited number of semantically closest other requirements. So, one considers that a requirement can be formally described, within the context of the whole specification AS, by a limited set of sem-uplets that represent the semantically closest other requirements.

For instance, if R2 is linked with R1 and R3, but sem-uplet (R2, R3)>sem-uplet(R2, R1), then only the link R2-R3 is kept on the final model. This is a question of optimization. Tuning the model is possible by determining the maximum acceptable gap between two sem-uplets. For example, one may consider that only the link R2-R3 will be kept if diff(sem-uplet(R2, R3), sem-uplet(R2, R1))>10 where "diff( )" is the function difference (or subtraction) in a variant, the limit (or threshold) for the function "diff( )" can be equal to 5 or 15, depending on the problem category or the kind of requirements. In another variant, all the links corresponding to a function diff( ) greater than a minimal critical level can be kept in the problem model (or requirement network), and therefore duplicate into the solution model.

Solution "molecule" has the same spatial structure as the problem "molecule", although they do not contain and use the same kinds of atoms: problem atoms are requirements, solution atoms are components SC. Problem atoms are linked together because they share the same concepts and address the same requirements, while solution atoms are linked together because they share or exchange the same data. However the requirement network (or problem molecule) that contains the pertinent links between requirements contains the same links as the application architecture (or solution).

These two kinds of atoms being different and having not exactly the same nature, the links that are pertinent into the requirement network may be non pertinent in the initial component structure. Indeed, the fact that two requirements share the same concepts does not necessarily imply that the two corresponding components have an interaction together. So, the processing module PM can be arranged in order to optimize the initial architecture of the application AS, and more precisely in order to determine the best component interaction model.

The optimization process aims at keeping only the most useful of the links inherited from the problem structure, i.e. the associations corresponding to actual data exchanges between two components SC (Comp1 and Comp2) where the output of component Comp1 is an input for Comp2 or inversely.

This optimization process can use the semantic tags attached as semantic metadata to the data descriptions of the components' operations (and more precisely to their inputs and outputs) to determine and optimize the interactions between the selected components SC.

If these semantic tags are suitably chosen and set, the components SC can be connected and their connectivity can be formally expressed. For example, if the output of Comp1.operation_A( ) semantically fits with the input of Comp2.operation_B( ), then Comp1 can be connected to Comp2 through the link "output of A" to "input of B", and it is possible to write:

out_A=Comp1.operation_A(A_parameters);
out_B=Comp2.operation_B(out_A);
or, more directly:
out_B=Comp2.operation_B(Comp1.operation_A (A_parameters)).

This means that the two connected data have the same semantic "dimension", i.e. they semantically fit each other (or they are process-compatible) because they share not only the same data type, but also the same nature of data. This semantic data type can be expressed by the parameter "semTag" which is similar to an UML tagged value and is attached to the inputs and outputs within the semantic descriptions (or semantic cards) SD.

The fact that it is possible to connect the output of Comp1 to the input of Comp2 because they semantically fit each other, (for example, Comp1 produces a text and Comp2 consumes a text), does not necessarily imply that Comp2 is effectively waiting for the output of Comp1, instead of the output of Comp4 for instance, which is another component producing a text. In fact, the Comp1-Comp2 connectivity is proved because the interactions are built by following the links that are present in the solution structure. Even if Comp4 produces a text, it is not directly linked to Comp2. Consequently, there is no reason to try to combine their inputs-outputs.

SemTags ensure the consistency of components' interfaces, and for this reason they are important elements for optimizing components interactions. It is recalled that in an UML meaning the interface of a component SC is made of the set of its public operations, with their parameters. For example, let us suppose Comp1.operation_A( ) provides a text, and Comp2.operation_B( ) is the operation translate( ) of a component Translator. As it makes sense to translate a text, the output of Comp1.operation_A( ) has to fit with the input of Translator.translate( ). But suppose that Comp1.operation_A( ) provides the stock symbol for a given company, this symbol and the text taken as input by Translator.translate( ) can have the same data type (String), but they are not semantically equivalent because it does not make sense to try to translate a stock symbol. Therefore, the semantic information attached to these two data must be different, and consequently the two operations, and their two components SC, are not connectable (or linkable).

A non limiting example of a semantic card SD of a component Translator is given hereafter to show the usefulness of semTags:

```
<semCard>
<URL>http://xxx.xx.xxx.x/components/Translation/Translator.asmx</URL>
    <component name="Translator">
        <domains>
            <domain name="Translation">
                <concepts list="translation, version, language, source language, target language, result" />
            </domain>
            <domain name="Text">
                <concepts list="text, chapter, paragraph, sentence, phrase, word, language" />
            </domain>
        </domains>
        <operation name="translate">
            <inputs>
                <input name="text_to_translate" concept="Text#Text" semtag="text" />
                <input name="source_language" concept="Translation#SourceLanguage" semtag="language" />
                <input name="target_language" concept="Translation#TargetLanguage" semtag="language" />
            </inputs>
            <output name="translated_text" concept=" Text#Text " semtag="text" />
            <goal> The goal  of the operation is to provide a translated_text written in a given target_language as a result of the translation of a given text_to_translate written in a source_language.
            </goal>
        </operation>
    </component>
</semCard>.
```

When components SC are web services, for instance, their semantic descriptions (semantic cards) SD can be generated from the WSDL (Web Service Description Language) of the service. But in order to automatically set the semantic tags, an optional and specific semantic module SSM of the device D can be used, as illustrated in the unique FIGURE. This module SSM could be part of the processing module PM.

This semantic module SSM can analyze the names and types of the operations' parameters, as described in WSDL, and can search for semantic correspondences in a specific ontology.

This specific ontology contains the links between the semantics of the current names and types of input and output data as they are usually used by programmers, and the corresponding semantic tags.

For instance, a data named "text" or "content" or "translated_page" or "description" with the type "string" can have the semantic tag "text", because the data has the "dimension" of a text. A data named "date" or "current_date", with a type "Date" or "String" can have the semantic tag "date", etc.

Such a specific ontology, intended for automatically setting semantic tags within semantic cards SD, can be expressed as a simple correspondence table. An example of such a correspondence table is given hereafter.

| Data name | Type | Semantic tag |
|---|---|---|
| text, content, page, description, . . . | String | text |
| date, current_date, . . . | String\|Date | date |
| phone_number, mobile_phone, . . . | String | telephone_number |
| lang, language, dest_lang, srce_lang, . . . | String | language |
| postal_code, zip_code, city_code, . . . | String | zip_code |

Such a specific ontology can be easily built by the man skilled in the art and it can be improved progressively by analyzing the contents of published component interfaces that show the practice of programmers and then by summarizing their good usages.

An example showing how the semantic tags are taken into account to build an automatic component interaction model is given hereafter.

In this non limiting example it is assumed that a requirement of the specification AS (expressed in natural language) indicates that the application AP is intended for producing a translated version of a news feed. Moreover it is assumed that the sem-uplet plus component-discovery approach has allocated two components SC to this requirement: a RSS-accessor component and a Translator component (whose examples of semantic cards SD have been given above).

For instance, the RSS-accessor component aims at gathering information from RSS feeds accessible via Internet, and its interface contains two operations: getAllTitles( ) gets all the main titles of the feed for a given URL, and getDescriptionOfTitle( ) gets the text of the short article for this title.

For instance, the Translator component is a classical one whose operation translate( ) transforms a text (given as an input parameter) written in a given source language (input parameter) into a translated text (output) written in a destination language (input parameter).

Now, the issue is to assemble automatically and logically these two components, i.e. their three operations in order to fulfill the specification requirement (i.e. provide a translated version of a news feed). For this purpose, two points have to be taken into consideration.

A first point consists in considering the semantic tags as inputs and outputs of the component operations, instead of data. This allows to make appear some possible connectivities, but not precisely enough to make a fully consistent composition.

A second point consists in considering the main output of the targeted component assembly in order to find which component operations can provide its inputs, and to iterate the process for these operations: search which other operations can provide their inputs. Then, one goes back progressively from the main output to the input data necessary to produce it, and in doing this, one automatically assembles the different component operations by linking their outputs and inputs At the same time, the links can be stored in a FILO (first in, last out) stack under the form of pseudo-code expressing the operation calls. At the end of this process, the content of the stack represents the correct interactions between the selected components.

The main output of the component assembly is given by the expression of the specification requirement. In this example, where a translated version is wished, the main output is a translated text, i.e. the output of the operation Translator. translate( ). So, one can push this main output in the stack, expressed as the "return" of the function represented by the targeted component assembly:

translated_text=Translator.translate(text_to_translate, src_lang, dest_lang); return translated_text.

If one goes back now to the inputs of this operation, whose respective semantic tags are "language", "language" and "text", one can see that a data with a semantic tag "text" is provided by the operation RSS.getDescriptionOfTitle( ). So, one can connect this operation to Translator.translate( ), and one can add the call to the operation RSS.getDescriptionOfTitle( ) in the stack, linking with Translator.translate( ) through the name of the exchanged parameter as follows:
text_to_translate=RSS.getDescriptionOfTitle(site_address, title);
translated_text=Translator.translate(text_to_translate, src_lang, dest_lang);
return translated_text.

Now, if one goes back to the inputs of RSS.getDescriptionOfTitle( ), whose semantic tags are "URL" and "title", one can see that a data with a semantic tag "title" is provided by the operation RSS.getAllTitles( ). So, one can also connect these two operations by pushing a new operation call in the stack:
titles=RSS.getRSSTitles(adr_site);
text_to_translate=RSS.getDescriptionOfTitle(site_address, title);
translated_text=Translator.translate(text_to_translate, src_lang, dest_lang);
return translated_text.

All the components SC allocated to the specification requirements being used and connected together, the stack now contains the general structure of the component assembly, under the form of a nearly executable pseudo-code. However, it is preferable to bring refinements to this pseudo-code before executing it. Some of these refinements are listed hereafter:
- the data types must be taken into account. For instance, RSS.getAllTitles( ) returns an array of Strings and not a single String,
- the names of some parameters can be solved through their semantics, i.e. with the help of their semTags. For instance, "adr_site" and "site_address" recover the same concept and have the same semTag,
- some other parameters can be solved with some useful information contained in the original requirement. For instance, if the requirement specifies a French translation, then the parameter "dest_lang" of the operation Translator.translate( ) has to be set to "French", and
- some additional components SC or component operations can be used to solve other parameters. For instance, the parameter "src_lang" can be set by using a utility component, a "Language Finder", to automatically determine the source language of a given text, or an operation getSourceLanguage( ) on the RSS feed component.

Another optional and specific module OSM of the device D can be provided in order to carry out the refinements intended for completing the pseudo-code. This module OSM could be part of the processing module PM, or coupled to the processing module PM as illustrated in the unique FIGURE. For instance, this module OSM can be a software module such as the following one:

```
Vector ComponentAssembly(String site_address) {
Vector result;
titles = RSS.getAllTitles(site_address);
foreach title in titles {
    text_to_translate = RSS.getDescriptionOfTitle(site_address, title);
    source_lang = LanguageFinder.getLanguage(text_to_translate);
    translated_text = Translator.Translate(text_to_translate,
    source_lang, "french");
    result.add(title + translated_text);
}
return result;
}.
```

After having been possibly refined, the pseudo-code can finally be transformed into an executable Java file, for instance, in order to test the validity of the component assembly produced by the optimization process.

As the semantic analysis of the original text of specification AS is automatic, and considering that the discovery and assembly of software components SC is automatic, considering that the optimization of the application design is also automatic, and finally considering that a compilable and executable code generation is possible from this optimized design, the invention can be considered as a mean to produce an executable application AP directly from the text of its specification AS.

The device D, and more precisely its analysis module AM and processing module PM, and possibly its storing means SM, are preferably software modules. But they may be also respectively made of electronic circuit(s) or hardware modules, or a combination of hardware and software modules.

The invention can also be considered in terms of a method for building applications AP from software components SC.

Such a method may be implemented by means of a device D such as the one above described with reference to the unique FIGURE. Therefore, only its main characteristics will be mentioned hereafter.

The method according to the invention consists, each time a specification AS (describing an application AP to be built) is received:
- of performing a semantic analysis of this specification AS, in order to extract elementary requirements SR from the text of the specification AS, and links between these elementary requirements SR, the set of these links being called "the overall structure of the specification", then
- of extracting, for each elementary requirement SR, the pertinent terms it comprises and building, for each elementary requirement SR, a "semantic description" based on its extracted pertinent terms and which represents "the semantics of this elementary requirement", then
- of accessing to at least one component repository SM, where each component SC is registered and described as a "semantic software component" SSC, to determine, for each extracted elementary requirement SR, by comparing the semantics of this elementary requirement SR and the components semantic descriptions SD, which component(s) is (are) able to cover the extracted elementary requirement SR, and,
- of finally assembling these determined software components SC according to the overall structure of the specification, in order to build the application AP.

The invention is not limited to the embodiments of method and device described above, only as examples, but it encompasses all alternative embodiments which may be considered by one skilled in the art within the scope of the claims hereafter.

The invention claimed is:
1. A method for automatically building applications from specifications and software components comprising:

each time a device receives a specification comprising text that includes terms describing functional and non-functional requirements to be performed by an application to be built:
   performing a semantic analysis of the text of the specification and extracting terms defining elementary requirements, links between the terms defining elementary requirements, and a logical order between the links, the links and the logical order between the links defining an overall structure of the specification, wherein the logical order is determined as a function of input and output parameters of software components configured to perform operations for carrying out the elementary requirements defined by the extracted terms;
   extracting, for each elementary requirement, pertinent terms in the elementary requirement and building, for each elementary requirement, a semantic description based on the extracted pertinent terms wherein the description represents semantics of the elementary requirement;
   accessing at least one component repository comprising stored semantic software components, each software component being associated to a semantic description comprising at least one pertinent term that defines each public operation said software component is able to perform;
   determining, for each extracted elementary requirement, by comparing the semantics of the elementary requirement and the software components' semantic descriptions, one or more software components able to perform said extracted elementary requirement; and
   assembling the determined one or more software components according to said overall structure of the specification, in order to build the application;
   wherein at least some of said semantic descriptions of the software components comprise:
      a goal of an operation the software component is able to perform;
      at least one domain identifier designating a domain comprising defined terms describing said operation's goal and input and output parameters of said operation; and
      at least one of pertinent terms and specific meta-data associated to the input and output parameters.

2. The method according to claim 1, further comprising:
for each of said extracted elementary requirements, determining a semantic distance between its semantic description and the semantic description of each of said stored software components; and
selecting the stored software component corresponding to the minimal semantic distance, the selected software component being therefore intended to implement said elementary requirement.

3. The method according to claim 1, further comprising:
associating a primary n-uplet of words, called a "syn-uplet", to each pertinent term of an elementary requirement to generate a "req-uplet";
associating a syn-uplet to each pertinent term of the goal of each public operation of each software component to generate a "comp-uplet"; and
comparing each of the req-uplets to each of the comp-uplets in order to determine the semantic distance between each elementary requirement and each stored software component.

4. The method according to claim 3, further comprising:
determining a semantic proximity representative of the number of words that are common to each req-uplet and to each comp-uplet;
for each elementary requirement, building a secondary n-uplet called "sem-uplet" and expressing the semantic proximities between each of the req-uplets and the req-uplets of each of the comp-uplets, each secondary n-uplet defining a semantic distance; and
selecting the stored software component corresponding to the secondary n-uplet which defines the minimal semantic distance.

5. The method according to claim 2, further comprising:
establishing the same pertinent links as those defining said overall structure of the specification between the selected stored software components that correspond to said extracted elementary requirements, in order to optimize the structure of the application.

6. The method according to claim 3, wherein, to determine said overall structure of the specification, the method further comprises:
determining a semantic proximity representative of the number of words that are common to the req-uplets of each pair of elementary requirements; and
for each elementary requirement, building a secondary n-uplet, called "sem-uplet" and comprising the semantic proximities between its req-uplet and the req-uplets of the other elementary requirements, each sem-uplet defining a semantic distance; and
establishing a pertinent link between two distinct elementary requirements when the value of their sem-uplet is maximal.

7. A device for automatically building applications from specifications and software components comprising:
   a non-transitory computer-readable medium that stores semantic software components, each software component being associated to a semantic description comprising at least one pertinent term that defines each public operation said software component is able to perform;
   an analysis module configured to:
      receive a specification describing an application to be built;
      perform a semantic analysis of said specification, wherein the specification comprises text including terms that describe functional and non-functional requirements to be performed by the application to be built, in order to extract terms defining elementary requirements from the text of said specification, links between terms defining the elementary requirements, and a logical order between the links, the links and the logical order between the links defining an overall structure of the specification, wherein the logical order is determined as a function of input and output parameters of software components configured to perform operations for carrying out the elementary requirements defined by the extracted terms;
      extract, from each elementary requirement, pertinent terms comprised by the elementary requirement;
      build, for each elementary requirement, a semantic description based on the pertinent terms extracted from the elementary requirement wherein the description represents semantics of the elementary requirement;
      access said non-transitory computer-readable medium and determine, for each extracted elementary requirement, by comparing semantics of the elementary requirement and the software components' semantic descriptions, one or more software components able to perform said extracted elementary requirement; and a processing module configured to assemble the determined one or more software components according to said overall structure of the specification in order to build said application;

wherein at least some of said semantic descriptions of the software components comprise:
- a goal of an operation the software component is able to perform;
- at least one domain identifier designating a domain comprising defined terms describing said operation's goal and input and output parameters of said operation; and
- at least one of pertinent terms and specific meta-data associated to the input and output parameters.

8. The device according to claim 7, wherein said analysis module is configured to:
determine, for each extracted elementary requirement, a semantic distance between its semantic description and the semantic description of each of said stored software components; and
select the stored software component corresponding to the minimal semantic distance, the selected software component being capable of implementing the elementary requirement.

9. The device according to claim 7, wherein said analysis module is configured to:
associate a primary n-uplet of words, called a "syn-uplet", to each pertinent term of an elementary requirement, the syn-uplet being called a "req-uplet"; and
compare each of these req-uplets to comp-uplets, which are syn-uplets associated to each pertinent term of the goal of each public operation of each software component, in order to determine the semantic distance between each elementary requirement and each stored software component.

10. The device according to claim 9, wherein said analysis module is configured to:
establish a semantic proximity representative of the number of words that are common to each req-uplet and to each comp-uplet;
for each elementary requirement, build a secondary n-uplet, called "sem-uplet" and expressing the semantic proximities between each of the req-uplets and the ones of each of the comp-uplets, each secondary n-uplet defining a semantic distance; and
select the stored software component corresponding to the secondary n-uplet which defines the minimal semantic distance.

11. The device according to claim 8, wherein said processing module is configured to establish the same pertinent links as those defining the overall structure of the specification between the selected stored software components that correspond to said the extracted elementary requirements, in order to optimize the structure of the application.

12. The device according to claim 9, wherein to determine said overall structure said analysis module is configured to:
determine a semantic proximity representative of the number of words that are common to the req-uplets of each pair of elementary requirements;
for each elementary requirement, build a secondary n-uplet comprising the semantic proximities between its req-uplet and the ones of the other elementary requirements, each secondary n-uplet defining a semantic distance; and
establish a pertinent link between two distinct elementary requirements when the value of their sem-uplet is maximal.

13. The method according to claim 2, further comprising:
associating a primary n-uplet of words, called a "syn-uplet", to each pertinent term of an elementary requirement to generate a "req-uplet";
associating a syn-uplet to each pertinent term of the goal of each public operation of each software component to generate a "comp-uplet"; and
comparing each of the req-uplets to each of the comp-uplets in order to determine the semantic distance between each elementary requirement and each stored software component.

14. The device according to claim 8, wherein said analysis module is configured to:
associate a primary n-uplet of words, called a "syn-uplet", to each pertinent term of an elementary requirement to generate a "req-uplet"; and
comparing each of these req-uplets to comp-uplets, which are syn-uplets associated to each pertinent term of the goal of each public operation of each software component, in order to determine the semantic distance between each elementary requirement and each stored software component.

* * * * *